US011942627B2

(12) United States Patent
Yamamoto et al.

(10) Patent No.: US 11,942,627 B2
(45) Date of Patent: Mar. 26, 2024

(54) POSITIVE ELECTRODE AND LITHIUM ION SECONDARY BATTERY THAT INCLUDE UNDERCOAT LAYER CONTAINING MICROCAPSULE

(71) Applicant: MITSUI CHEMICALS, INC., Tokyo (JP)

(72) Inventors: Shinji Yamamoto, Sodegaura (JP); Yuri Endo, Matsudo (JP)

(73) Assignee: MITSUI CHEMICALS, INC., Tokyo (JP)

( * ) Notice: Subject to any disclaimer, the term of this patent is extended or adjusted under 35 U.S.C. 154(b) by 810 days.

(21) Appl. No.: 16/975,974

(22) PCT Filed: Mar. 29, 2019

(86) PCT No.: PCT/JP2019/014283
§ 371 (c)(1),
(2) Date: Aug. 26, 2020

(87) PCT Pub. No.: WO2019/189866
PCT Pub. Date: Oct. 3, 2019

(65) Prior Publication Data
US 2021/0043928 A1  Feb. 11, 2021

(30) Foreign Application Priority Data
Mar. 30, 2018  (JP) ................. 2018-068824

(51) Int. Cl.
*H01M 4/36*  (2006.01)
*H01M 4/02*  (2006.01)
(Continued)

(52) U.S. Cl.
CPC ............. *H01M 4/366* (2013.01); *H01M 4/13* (2013.01); *H01M 4/622* (2013.01); *H01M 4/625* (2013.01);
(Continued)

(58) Field of Classification Search
CPC ........ H01M 4/366; H01M 4/13; H01M 4/622; H01M 4/625; H01M 50/489; H01M 50/491; H01M 50/411; H01M 10/0525
See application file for complete search history.

(56) References Cited

U.S. PATENT DOCUMENTS

2016/0240836 A1  8/2016  Aotani et al.
2018/0205115 A1  7/2018  Haba et al.
2019/0020057 A1  1/2019  Fujisawa

FOREIGN PATENT DOCUMENTS

CN         107851836 A        3/2018
JP      2001332245 A   *  11/2001    ............ H01M 10/05
(Continued)

OTHER PUBLICATIONS

International Search Report (with an English translation thereof) and Written Opinion issued by the Japan Patent Office dated Jul. 2, 2019, in corresponding International Patent Application No. PCT/JP2019/014283, 9 pages.

*Primary Examiner* — Karie O'Neill Apicella
(74) *Attorney, Agent, or Firm* — BUCHANAN, INGERSOLL & ROONEY PC (57) ABSTRACT

A positive electrode for a lithium ion secondary battery, including a positive electrode current collector; and a positive electrode mixture layer that is provided on at least one side of the positive electrode current collector, the positive electrode mixture layer including a positive electrode active material layer, and an undercoat layer formed between the positive electrode current collector and the positive electrode active material layer, the undercoat layer containing a conductive auxiliary, a binder, and a thermally expandable microcapsule having a maximum volume expansion temperature of from 70° C. to 180° C.

8 Claims, 2 Drawing Sheets

(51) Int. Cl.

| | | |
|---|---|---|
| *H01M 4/13* | (2010.01) | |
| *H01M 4/62* | (2006.01) | |
| *H01M 10/0525* | (2010.01) | |
| *H01M 50/409* | (2021.01) | |
| *H01M 50/411* | (2021.01) | |
| *H01M 50/489* | (2021.01) | |
| *H01M 50/491* | (2021.01) | |

(52) U.S. Cl.
CPC ..... *H01M 10/0525* (2013.01); *H01M 50/409* (2021.01); *H01M 50/411* (2021.01); *H01M 2004/021* (2013.01); *H01M 2004/028* (2013.01); *H01M 50/489* (2021.01); *H01M 50/491* (2021.01)

(56) References Cited

FOREIGN PATENT DOCUMENTS

| | | | | |
|---|---|---|---|---|
| JP | 2001332245 | A | 11/2001 | |
| JP | 4727021 | B2 | 4/2011 | |
| JP | 2013-105681 | A | 5/2013 | |
| JP | 2015-088370 | A | 5/2015 | |
| JP | 2015115168 | A * | 6/2015 | ............. H01M 2/34 |
| JP | 2015115168 | A | 6/2015 | |
| KR | 10-2016-0061391 | A | 5/2016 | |
| WO | 2017149927 | A1 | 9/2017 | |
| WO | 2018043382 | A1 | 3/2018 | |

\* cited by examiner

FIG. 1

FIG. 2

POSITIVE ELECTRODE AND LITHIUM ION SECONDARY BATTERY THAT INCLUDE UNDERCOAT LAYER CONTAINING MICROCAPSULE

TECHNICAL FIELD

The present invention relates to a positive electrode including an undercoat layer containing a microcapsule, and a lithium ion secondary battery in which the positive electrode is used.

BACKGROUND ART

In recent years, lithium ion secondary batteries have been widely used as power sources of electronic devices such as mobile phones and laptop computers, of electric vehicles, and for power storage. In particular, demand for batteries having high capacity, high output, and high energy density that can be mounted on hybrid vehicles and electric vehicles has been rapidly expanding in recent years. Lithium ion secondary batteries have the advantage of high energy density. However, sufficient measures for safety are required because lithium metal and lithium ions are used in the batteries.

It has been conventionally reported that against a rapid temperature rise inside a battery due to overdischarge, overcharge, and the like, a thermally expandable microcapsule is disposed in the battery in order to inhibit a conductive state in the battery (see Patent Document 1).

Furthermore, an electrode for a lithium ion secondary battery and a lithium ion secondary battery including the electrode have been reported. The electrode includes a polymer particle having a melting point (Tm) of from 70° C. to 150° C. in the positive electrode or negative electrode active material layer, so that the electrode has a function of increasing the internal resistance of the battery in the case of a temperature rise and has an excellent battery characteristic during usual operation, and is manufactured by a simple manufacturing process. (For example, see Patent Document 2).

Patent Document 1: Japanese Patent No. 4727021
Patent Document 2: Japanese Patent Application Laid-Open (JP-A) No. 2015-115168

SUMMARY OF INVENTION

Technical Problem

An object of the present invention is to suppress a short-circuit current by providing a PTC function in an electrode and increasing the resistance of the electrode in the case of heat generation by forming an undercoat layer between a positive electrode current collector and a positive electrode mixture layer that are used in a lithium ion secondary battery.

Solution to Problem

A solution to the above-described problem includes the following aspects.
<1> A positive electrode for a lithium ion secondary battery, the positive electrode including:
  a positive electrode current collector; and
  a positive electrode mixture layer that is provided on at least one side of the positive electrode current collector, the positive electrode mixture layer including:
    a positive electrode active material layer, and
    an undercoat layer formed between the positive electrode current collector and the positive electrode active material layer, the undercoat layer containing:
      a conductive auxiliary,
      a binder, and
      a thermally expandable microcapsule having a maximum volume expansion temperature of from 70° C. to 180° C.
<2> The positive electrode according to the item <1>, wherein the undercoat layer further contains a polymer particle having a softening point of from 70° C. to 150° C., and the softening point of the polymer particle is lower than the maximum volume expansion temperature of the thermally expandable microcapsule.
<3> The positive electrode according to the item <2>, wherein the polymer particle has an average particle size of from 0.1 to 5µm.
<4> The positive electrode according to any one of items <1> to <3>, wherein the conductive auxiliary comprises a carbon particle having an average particle size of 5 µm or less and a primary particle size of 0.5 µm or less, and the binder has an average particle size of from 0.1 to 0.3 µm.
<5> The positive electrode according to any one of items <1> to <4>, wherein the undercoat layer contains the conductive auxiliary at a content of from 5 to 20% by mass, and contains the binder at a content of from 3 to 20% by mass.
<6> The positive electrode according to any one of items <1> to <5>, wherein the thermally expandable microcapsule has an average particle size of 50 µm or less, and the undercoat layer contains the thermally expandable microcapsule at a content of from 5 to 20% by mass.
<7> The positive electrode according to any one of items <1> to <6>, wherein the thermally expandable microcapsule includes:
  an outer shell including a thermoplastic resin; and
  a volatile expanding agent that includes a hydrocarbon having a boiling point of 100° C. or less and that is enclosed in the outer shell.
<8> The positive electrode according to any one of items <1> to <7>, wherein the binder is polyacrylic acid, styrene-butadiene rubber, polyvinyl alcohol, polyvinyl acetate, polyethylene oxide, polyvinyl pyrrolidone, polyacrylamide, or water-dispersible polyvinylidene fluoride.
<9> A lithium ion secondary battery, including:
  the positive electrode according to any one of items <1> to <8>;
  a negative electrode;
  a separator; and
  a nonaqueous electrolyte.
<10> The lithium ion secondary battery according to item <9>, wherein the separator includes a thermoplastic resin, and the thermoplastic resin has a softening point that is higher than a melting point of the polymer particle and lower than a volume expansion start temperature of the thermally expandable microcapsule.

Advantageous Effects of Invention

In the positive electrode according to the invention, the resistance of the undercoat layer formed between the positive electrode current collector and the positive electrode active material layer is increased and an excessive current is prevented from flowing in the battery in the case of abnormal heat generation due to an internal short-circuit or the like, so that the safety of the lithium ion secondary battery can be improved.

DESCRIPTION OF EMBODIMENTS

In the present description, a numerical range represented using "to" means a range including numerical values described before and after "to" as a lower limit and an upper limit.

In the present description, in a case in which there are a plurality of substances corresponding to each component in a composition, the amount of each component in the composition is the total amount of the plurality of substances present in the composition unless otherwise specified.

Hereinafter, preferred embodiments according to the present invention will be described. The invention can be widely applied to various lithium ion secondary batteries including a positive electrode current collector and a positive electrode mixture layer including a positive electrode active material layer and an undercoat layer on at least one side of the positive electrode current collector. In the batteries, by forming the undercoat layer between the positive electrode current collector and the positive electrode active material layer according to the present embodiment, the resistance between the positive electrode current collector and the positive electrode active material layer is increased in the case of a rapid temperature rise in the battery, so that the effect of suppressing the overheating of the battery is exhibited. Hereinafter, the invention will be described in more detail mainly with reference to the lithium ion secondary battery including the undercoat layer between the positive electrode current collector and the positive electrode active material layer as an example, but the application of the invention is not intended to be limited to such an electrode or a battery.

[Overall Configuration of Lithium Ion Secondary Battery]

Figure 1:
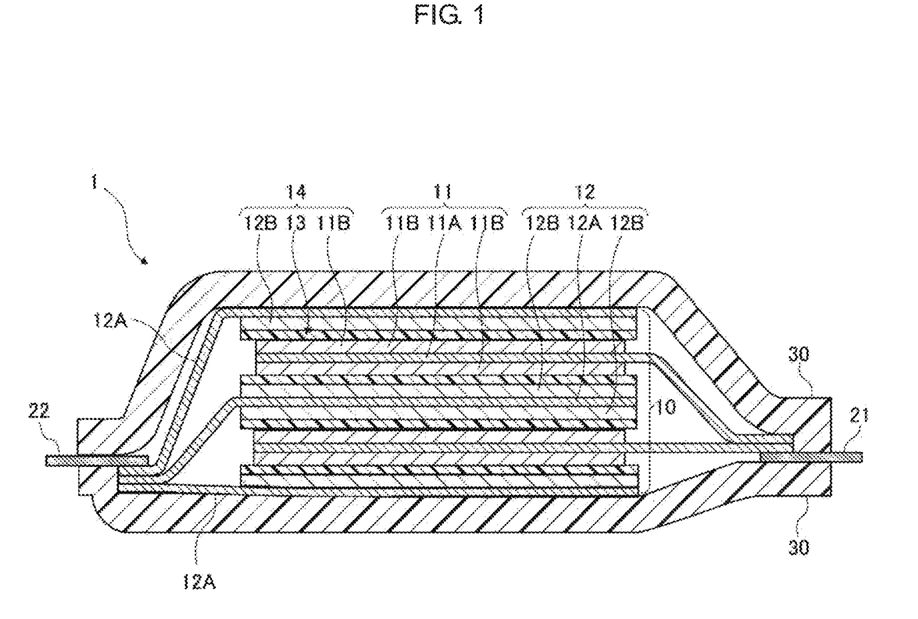
FIG. 1 is a sectional view of a lithium ion secondary battery according to an embodiment of the invention.

First, an overall configuration of a lithium ion secondary battery according to one embodiment of the invention will be described with reference to the drawings. FIG. 1 is a schematic sectional view illustrating a lithium ion secondary battery according to one embodiment of the invention. Such a lithium ion secondary battery is called a stacked lithium ion secondary battery.

Although FIG. 1 shows the configuration of the stacked cell, the lithium ion secondary battery according to the invention may be wound so that the positive electrode, the negative electrode, and the separator are stacked and wound in layers.

As shown in FIG. 1, a lithium ion secondary battery 1 according to the present embodiment has a configuration in which a battery element 10 to which a positive electrode lead 21 and a negative electrode lead 22 are attached is enclosed in an exterior body 30 that is formed with a laminate film. In the present embodiment, the positive electrode lead 21 and the negative electrode lead 22 are led out in the opposite directions from the inside to the outside of the exterior body 30. Although not shown, the positive electrode lead and the negative electrode lead may be led out in the same direction from the inside to the outside of the exterior body. Such a positive electrode lead and a negative electrode lead can be attached to the positive electrode current collector and the negative electrode current collector described below by, for example, ultrasonic welding, resistance welding, or the like.

As shown in FIG. 1, the battery element 10 has a configuration in which a plurality of laminates are stacked in which a positive electrode 11 having a positive electrode mixture layer 11B formed on both main surfaces of a positive electrode current collector 11A, a separator 13, and a negative electrode 12 having a negative electrode mixture layer 12B formed on both main surfaces of a negative electrode current collector 12A are stacked. At this time, the positive electrode mixture layer 11B formed on one main surface of the positive electrode current collector 11A of one positive electrode 11 and the negative electrode mixture layer 12B formed on one main surface of the negative electrode current collector 12A of the negative electrode 12 adjacent to the one positive electrode 11 are opposite to each other with the separator 13 interposed therebetween. Thus, the positive electrode, the separator, and the negative electrode are stacked in this order to form the plurality of laminates.

By putting an electrolytic solution containing an electrolyte ($LiPF_6$) into the battery element, one unit cell layer 14 is configured to have the adjacent positive electrode mixture layer 11B, separator 13, and negative electrode mixture layer 12B. Therefore, the lithium ion secondary battery 1 according to the present embodiment has a configuration in which a plurality of the unit cell layers 14 are stacked to be electrically connected in parallel. The positive electrode and the negative electrode may have an active material layer formed on one side of each current collector.

[Positive Electrode for Lithium Ion Secondary Battery]

Figure 2:
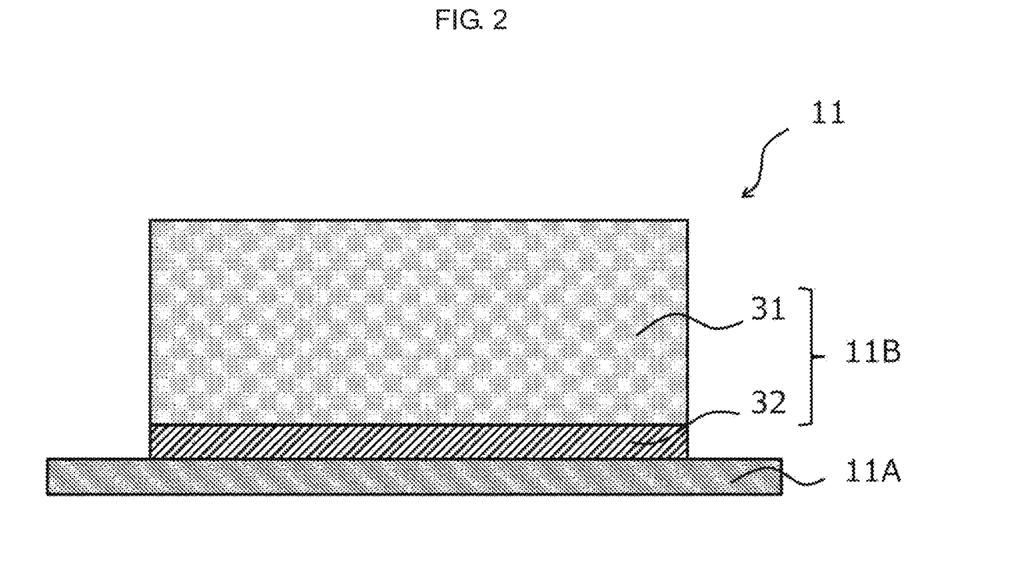
FIG. 2 is a schematic sectional view illustrating a structure of a positive electrode according to an embodiment of the invention.

FIG. 2 is a schematic sectional view illustrating a structure of the positive electrode 11 as an electrode according to one embodiment of the invention. The positive electrode 11 shown in FIG. 2 has a configuration in which the positive electrode mixture layer 11B is provided on one side of the positive electrode current collector 11A. Here, an undercoat layer 32 having a thickness of from 0.1 μm to 50 μm is formed between the positive electrode current collector 11A and a positive electrode active material layer 31, and the undercoat layer 32 contains a conductive auxiliary, a binder, and a thermally expandable microcapsule having a maximum volume expansion temperature of from 70° C. to 180° C. The undercoat layer 32 and the positive electrode active material layer 31 are included in the positive electrode mixture layer, and are in contact with the electrolytic solution containing the electrolyte ($LiPF_6$) put into the battery.

Various materials can be used in the positive electrode current collector 11A, and a metal or an alloy is usually used. Specific examples of the conductive substrate for the positive electrode include aluminum, nickel, and SUS, and specific examples of the negative electrode current collector include copper, nickel, and SUS. Among the conductive substrates, aluminum and copper are preferable in view of the balance between the high conductivity and the cost. Note that the word "aluminum" means aluminum and aluminum alloys, and the word "copper" means pure copper and copper alloys. In the present embodiment, an aluminum foil can be used in the secondary battery positive electrode side and in the secondary battery negative electrode side, and a copper foil can be used in the secondary battery negative electrode side. The aluminum foil is not particularly limited, but various materials such as pure aluminum-based A1085 and A3003 can be used. In the same manner, the copper foil is not particularly limited, and a rolled copper foil or an electrolytic copper foil is preferably used.

The undercoat layer 32 according to the present embodiment preferably has a thickness of from 0.1 μm to 50 μm, and more preferably from 0.2 to 20 μm. In a case in which the thickness is less than 0.1 μm, the resistance is sometimes not sufficiently increased in the case of abnormal heat generation, so that the shutdown function is not reliably exhibited. In a case in which the thickness is more than 50 μm, the resistance at normal time is also increased, so that the performance at high rate as a battery characteristic is reduced. Hereinafter, the conductive auxiliary, the binder, the thermally expandable microcapsule having a maximum volume expansion temperature of from 70° C. to 180° C., and a polymer particle having a softening point of from 70° C. to 150° C., included in the undercoat layer 32 will be described in order.

(Conductive Auxiliary)

The undercoat layer 32 preferably contains the conductive auxiliary. As the conductive auxiliary used in the invention, a known conductive auxiliary can be used. The known conductive auxiliary is not particularly limited as long as it is a conductive carbon material. Graphite, carbon blacks, conductive carbon fibers (carbon nanotubes, carbon nanofibers, and carbon fibers), fullerenes, and the like can be used singly, or in combination of two or more kinds thereof. Examples of a commercially available carbon black include TOKABLACK (registered trademark) # 4300, # 4400, # 4500, # 5500, and the like (manufactured by TOKAI CARBON CO., LTD., furnace black), PRINTEX (registered trademark) L and the like (manufactured by Degussa AG, furnace black), RAVEN 7000, 5750, 5250, 5000ULTRAIII, 5000ULTRA, and the like, CONDUCTEX SC ULTRA, CONDUCTEX 975ULTRA, and the like, PUER BLACK 100, 115, 205, and the like (manufactured by Columbian Chemicals Company, furnace black), # 2350, # 2400B, # 2600B, # 30050B, # 3030B, # 3230B, # 3350B, # 3400B, # 5400B, and the like (manufactured by Mitsubishi Chemical Corporation, furnace black), MONARCH 1400, 1300, 900, VULCAN (registered trademark) XC-72R, BLACK PEARLS 2000, LITX-50, LITX-200, and the like (manufactured by Cabot Corporation, furnace black), ENSACO (registered trademark) 250G, ENSACO (registered trademark) 260G, ENSACO (registered trademark) 350G, SUPER P-Li (manufactured by TIMCAL Ltd.), KETJENBLACK (registered trademark) EC-300J, EC-600JD (manufactured by AKZO NOBEL CHEMICALS B. V), DENKA BLACK (registered trademark), DENKA BLACK HS (registered trademark) −100, FX-35 (manufactured by DENKI KAGAKU KOGYO KABUSHIKI KAISHA, acetylene black), and the like, and examples of the graphite include artificial graphite and natural graphite such as flaky graphite, massive graphite, and earthy graphite, but examples are not limited thereto. The conductive auxiliary contained in the undercoat layer preferably has an average particle size of 5 μm or less, and more preferably from 1 to 4 μm for the purpose that the conductive auxiliary is dispersed among particles each contained in the undercoat layer and functions as a conductive auxiliary. Furthermore, the primary particle size of the conductive auxiliary is preferably 0.5 μm or less, and more preferably from 0.1 to 0.4 μm. The undercoat layer preferably contains the conductive auxiliary at a content of 5% by mass or more, and preferably, for example, about from 5 to 20% by mass for the purpose that the handling property of the slurry is improved and the capacity density of the positive electrode is enhanced.

(Binder)

As the binder, one can be used, or two or more can be used in combination selected from styrene-butadiene rubber (SBR), acrylonitrile-butadiene rubber, acrylonitrile-butadiene-styrene rubber, carboxymethylcellulose (CMC), hydroxypropylmethylcellulose, polyvinyl alcohol, hydroxypropylcellulose, or diacetylcellulose. In particular, it is desirable to use a mixture, as the binder, in which a water-dispersible binder such as an emulsion of styrene-butadiene rubber and a water-soluble binder such as carboxymethylcellulose are mixed if appropriate.

The binder is desirably used in an amount of from 3 to 20% by mass with respect to the undercoat layer in order to achieve both the physical properties (the electrolytic solution permeability and the peel strength) of the undercoat layer and the battery performance. In a case in which the amount is less than 3% by mass, the adhesive strength to the positive electrode active material layer is reduced. As a result, it is possible that the binder is detached from the active material layer during a charge and discharge process. In a case in which the amount is more than 20% by mass, the amount of the other components is reduced and undesirable in terms of increasing the resistance of the positive electrode in the case of heat generation.

(Thermally Expandable Microcapsule)

The thermally expandable microcapsule (often referred to as "microsphere") is configured to enclose or encapsulate a volatile expanding agent in an outer shell which is composed of a thermoplastic resin. Such a thermally expandable microcapsule is manufactured by a method of suspending and polymerizing, in an aqueous dispersion medium, a polymerizable mixture containing at least a volatile expanding agent and a polymerizable monomer that provides a polymer which constitutes an outer shell. For example, Japanese Patent Publication (JP-B) No. S42-26524, Japanese Patent Application Laid-Open (JP-A) No. S62-286534, JP-A No. H4-292643, and JP-A No. H11-209504 disclose a method of manufacturing a thermally expandable thermoplastic microsphere, and the methods can be applied to the manufacturing of the thermally expandable microcapsule according to the invention.

The thermoplastic resin which constitutes the outer shell needs to have durability against the electrolytic solution described below. More specifically, it is desired that the outer shell structure is stably maintained in contact with the electrolytic solution until the temperature reaches the operating temperature of the battery (generally intended to be from room temperature to about 80° C.), and the thermoplastic resin rapidly softens and foams to cause large volume expansion at a predetermined temperature immediately before the thermal runaway starts owing to abnormal heat generation of the battery in a state that the volatile expanding agent described below is encapsulated, that is, at a temperature of from 70° C. to 160° C., preferably from 80° C. to 160° C., and more preferably from 100° C. to 140° C. In the present embodiment, the temperature at which the volatile expanding agent encapsulated in the microcapsule gasifies and starts volume expansion is referred to as the "volume expansion start temperature". Furthermore, the temperature at which the volatile expanding agent encapsulated in the microcapsule gasifies, expands in volume, and expands to the maximum is referred to as the "maximum volume expansion temperature". The maximum volume expansion temperature of the microcapsule in the present embodiment is from 70° C. to 180° C., and the volume expansion start temperature is about from 20 to 30° C. lower than the maximum volume expansion temperature. Therefore, the thermoplastic resin itself preferably has a temperature at which the elastic modulus starts to decrease of from 40° C. to 160° C., and particularly preferably from 140° C. to 150° C. In the present embodiment, the boiling point of the volatile expanding agent is selected so that the maximum volume expansion temperature of the thermally expandable microcapsule is higher than the softening point of the polymer particle. Furthermore, the boiling point of the volatile expanding agent is preferably selected so that the volume expansion start temperature of the thermally expandable microcapsule is higher than the softening point of the polymer particle. By setting the maximum volume expansion temperature and the volume expansion start temperature of the thermally expandable microcapsules in such a manner, the resistance of the negative electrode can be efficiently increased in a case in which the temperature of the negative electrode mixture layer rises above the softening point of the polymer particle owing to heat generation of the battery.

That is, the thermoplastic resin which constitutes the outer shell of the microcapsule is preferably a polymer having excellent electrolytic solution resistance, thermoplasticity, and an excellent gas barrier property. From this viewpoint, the outer shell is preferably constituted with a (co)polymer containing vinylidene chloride and a (co)polymer containing (meth)acrylonitrile.

In consideration of the electrolytic solution resistance, the outer shell is preferably constituted with a (co)polymer containing (meth)acrylonitrile as a main component (51% by mass or more). Specific examples of the preferable polymer which constitutes the outer shell include copolymers obtained from a monomer mixture containing (a) 51% by mass or more of at least one monomer selected from the group consisting of acrylonitrile and methacrylonitrile and (b) 49% by mass or less of at least one monomer selected from the group consisting of vinylidene chloride, acrylates, methacrylates, styrene, and vinyl acetate. The monomer mixture more preferably contains (a) from 51 to 98% by mass of at least one monomer selected from the group consisting of acrylonitrile and methacrylonitrile, (b1) from 1 to 48% by mass of vinylidene chloride, and (b2) from 1 to 48% by mass of at least one monomer selected from the group consisting of acrylates and methacrylates. The (meth) acrylonitrile copolymerization ratio less than 51% by mass is not preferable because the solvent resistance and the heat resistance are reduced too much.

In order to improve the foaming characteristic and the heat resistance of the obtained microcapsule, a crosslinkable monomer can be used in combination with the polymerizable monomer. As the crosslinkable monomer, a compound having two or more carbon-carbon double bonds is usually used. More specific examples of the crosslinkable monomer include divinylbenzene, ethylene glycol di(meth)acrylate, diethylene glycol di(meth)acrylate, triethylene glycol di(meth)acrylate, allyl methacrylate, triallyl isocyanate, triacryl formal, trimethylolpropane tri(meth)acrylate, 1,3-butyl glycol dimethacrylate, and pentaerythritol tri(meth)acrylate. The crosslinkable monomer is usually used at a ratio of from 0.1 to 5% by mass with respect to the polymerizable monomer. For the purpose that the microcapsule has favorable durability against the electrolytic solution and reliably foams at a predetermined temperature in contact with the electrolytic solution, the crosslinkable monomer is preferably used at a ratio of 0.5% by mass, particularly from more than 1.0% by mass to 5% by mass, and particularly 4% by mass or less.

As the volatile expanding agent enclosed in the outer shell, a volatile organic compound is preferably used that gasifies at a predetermined temperature at which the microcapsule foams, more directly at a temperature equal to or lower than the softening point of the thermoplastic resin which constitutes the outer shell of the microcapsule. Examples of the volatile organic compound include low molecular weight hydrocarbons having a boiling point of 100° C. or less such as propane, propylene, n-butane, isobutane, butene, isobutene, isopentane, neopentane, n-pentane, n-hexane, isohexane, heptane, and petroleum ethers. Furthermore, in consideration of the safety inside the battery, examples of the volatile organic compound include non-flammable or flame-retardant compounds such as halogenated hydrocarbons and chlorofluorocarbons such as methyl chloride, methylene chloride, fluorotrichloromethane, difluorodichloromethane, and chlorotrifluoromethane. These compounds can be used singly, or in combination of two or more kinds thereof.

In the present embodiment, the boiling point of the volatile expanding agent is selected so that the maximum volume expansion temperature of the thermally expandable microcapsule is higher than the softening point of the polymer particle described below. Furthermore, the boiling point of the volatile expanding agent is preferably selected so that the volume expansion start temperature of the thermally expandable microcapsule is higher than the softening point of the polymer particle. By setting the maximum volume expansion temperature and the volume expansion start temperature of the thermally expandable microcapsule in such a manner, the resistance of the negative electrode can be efficiently increased in a case in which the temperature of the undercoat layer rises above the softening point of the polymer particle owing to heat generation of the battery.

The average particle size (median size) of the thermally expandable microcapsule can be controlled by a method generally used in this field. For example, in the suspension polymerization, the average particle size can be controlled by selection of a dispersion stabilizer, that is, by the type (for example, an inorganic fine particle such as colloidal silica or magnesium hydroxide) or the amount of a dispersion stabilizer, by combination with an auxiliary stabilizer (such as a condensation product of diethanolamine and aliphatic dicarboxylic acid, polyvinylpyrrolidone, polyethylene oxide, an emulsifier, or salt), by selection of an emulsifying and dispersing means, or by an emulsifying condition (such as a stirring condition). The average particle size is usually from 1 to 40 preferably from 3 to 30 µm, and particularly preferably from 5 to 25 µm. In particular, in a case in which the particle size distribution is sharp, the foaming start temperature is sharp and can be more suitably used in the invention. By selection of the volatile expanding agent and the polymerizable monomer and by control of the type and the amount of the crosslinkable monomer, the volatile expanding agent/polymerizable monomer weight ratio, and the like, a microcapsule can be obtained in which the expansion ratio is adjusted to a desired value in the range of from 2 to 100 times, preferably from 3 to 60 times.

With reference to FIG. 2 again, the thermally expandable microcapsule obtained as described above is preferably added in a minimum amount necessary for instantaneously achieving an effective separation between the positive electrode active material layer 31 and the positive electrode current collector 11A by the foaming of the thermally expandable microcapsule at a predetermined temperature, for example, at a rate of from 5 to 20% by weight, preferably from 5 to 10% by weight with respect to the entire undercoat layer 32.

Examples of the thermally expandable microcapsule usable in the invention include "MATSUMOTO MICROSPHERE (registered trademark)" series manufactured by Matsumoto Yushi-Seiyaku Co., Ltd., "EXPANCEL (registered trademark)" series manufactured by AKZO NOBEL CHEMICALS B. V., and "ADVANCELL (registered trademark)" series manufactured by SEKISUI CHEMICAL CO., LTD.

(Polymer Particle)

In the present embodiment, the undercoat layer 32 preferably contains the polymer particle having a softening point of from 70° C. to 150° C. The polymer particle is not particularly limited as long as it is, for example, a particle of a thermoplastic resin having a softening point of from 70° C. to 150° C. Examples of the polymer particle include particles of polyethylene, polypropylene, ethylene-vinyl acetate copolymers (EVAs), polyvinyl chloride, polyvinylidene chloride, polyvinyl fluoride, polyvinylidene fluoride, polyamides, polystyrene, polyacrylonitrile, thermoplastic elastomers, polyethylene oxide, polyacetal, thermoplastic modified cellulose, polysulfone, and polymethyl (meth)acrylate. Among the particles, particles of polyolefins such as polyethylene and polypropylene are preferable as the polymer particle. The polymer particles can be used singly, or in combination of two or more kinds thereof. Note that the word "(meth)acrylate" means an acrylate or a methacrylate in the invention. Here, the softening point can be represented by the Vicat softening temperature or the like of the thermoplastic resin measured in accordance with JIS K7206. The average particle size of the polymer particle is not particularly limited, and is preferably from 0.1 to 5 μm, more preferably from 0.2 to 4.5 μm, and still more preferably from 0.5 to 1 μm from the viewpoint that the mixture layer can be uniformly applied to the current collector and the battery characteristic can be further improved. As for the softening point of the polymer particle, from the viewpoint of improving the handling property and the safety of the lithium ion secondary battery, the polymer particle more preferably has a softening point of from 90° C. to 140° C., and still more preferably from 110° C. to 135° C.

Specifically, CHEMIPEARL (registered trademark) series manufactured by Mitsui Chemicals, Inc. (aqueous dispersion of a polyolefin) are preferable, and low molecular weight polyethylene such as W400, W410, W700, W4005, W401, W500, WF640, W900, W950, or WH201 can be used in the form of finely divided aqueous dispersion.

The content of the polymer particle having a softening point of from 70° C. to 150° C. used in the undercoat layer is preferably from 5 to 40% by mass, more preferably from 5 to 30% by mass, and still more preferably from 10 to 20% by mass with respect to the total amount of the undercoat layer. As for the average particle size of the polymer particle, for example, in the undercoat layer formed so that the undercoat layer containing the polymer particle having a softening point of from 70° C. to 150° C. has a thickness of about 70 μm, the average particle size can be determined by arithmetically averaging values of the long side lengths of all the polymer particles in an image of a transmission electron micrograph in the range of 10 μm in length×10 μm in width in the center portion of the undercoat layer.

(Inorganic Oxide Filler)

The undercoat layer according to the present embodiment preferably further contains an inorganic oxide filler as a filler. As the inorganic oxide filler, aluminum oxide ($\alpha$-$Al_2O_3$, $\gamma$-$Al_2O_3$), aluminum hydroxide ($Al(OH)_3$), boehmite ($AlOOH$)), magnesia (magnesium oxide: $MgO$), magnesium hydroxide ($Mg(OH)_2$), zirconia ($ZrO_2$), titania ($TiO_2$), silica ($SiO_2$), silicon dioxide ($SiO_2$), silicon carbide ($SiC$), aluminum nitride ($AlN$), boron nitride ($BN$), or the like is used. The inorganic oxide fillers may be used singly, or in mixture of two or more kinds thereof. The shape of the inorganic oxide filler is not limited, and the inorganic oxide fillers having various shapes, such as spherical, needle-shaped, ellipsoidal, plate-shaped, and flaky inorganic oxide fillers can be used. The average particle size is not particularly limited, and is preferably from 0.01 to 5 μm. In the present description, the term "average particle size" means, unless otherwise specified, a particle size at which the accumulation from the fine particle side is 50% by volume in a volume-based particle size distribution measured by a particle size distribution measuring device based on a general laser diffraction-light scattering method ($D_{50}$ particle size, median size).

The undercoat layer contains the inorganic oxide filler at a content of from 30 to 80% by mass, and preferably about from 40 to 60% by mass. Increase in the addition amount of the inorganic oxide filler contributes to the heat resistance of the positive electrode, and decrease, as much as possible, in the addition amount of the inorganic oxide filler contributes to improvement of the safety because the undercoat layer adheres to the positive electrode active material layer and melts in the case of an internal short-circuit. Furthermore, by selecting the type and a physical property of the inorganic oxide filler, it is possible to decompose the electrolytic solution and generate gas in the case of overcharge of the battery.

(Another Component)

The undercoat layer according to the present embodiment may contain another appropriate component in addition to each of the above-described components. For example, in a case in which the undercoat layer includes a mixture slurry, the undercoat layer sometimes contains a constituent component derived from the mixture slurry. Examples of the constituent component derived from the mixture slurry include thickeners and other additives such as surfactants, dispersants, wetting agents, and antifoaming agents.

(Method of Forming Undercoat Layer)

The undercoat layer according to the present embodiment can be manufactured by applying a mixture slurry containing the conductive auxiliary, the binder, and the thermally expandable microcapsule, and if necessary, the polymer particle, and the inorganic oxide filler to the surface of the positive electrode current collector, and drying the mixture slurry. The solvent contained in the mixture slurry may be an organic solvent or an aqueous dispersion, and water is preferably used in consideration of the stability of the thermally expandable capsule and the polymer particle. If necessary, for example, a liquid medium compatible with water may be used in order to improve the application property to the positive electrode current collector. Examples of the liquid medium compatible with water include alcohols, glycols, cellosolves, amino alcohols, amines, ketones, carboxylic amides, phosphoric amides, sulfoxides, carboxylic acid esters, phosphoric esters, ethers, and nitriles, and the liquid mediums may be used as long as compatible with water.

In the applying and the drying of the mixture slurry on the positive electrode current collector, the method of applying and the method of drying are not particularly limited. Examples of the method of applying include slot die coating, slide coating, curtain coating, and gravure coating. Examples of the method of drying include warm air drying, hot air drying, low-humidity air drying, vacuum drying, and drying by (far) infrared radiation. The drying time and the drying temperature are not particularly limited, and the drying time is usually from 1 minute to 30 minutes, and the drying temperature is usually from 40° C. to 80° C.

The method of manufacturing the mixture layer preferably include a step of reducing the porosity of the active material layer by a pressure treatment using a mold press, a roll press, or the like after the applying and the drying of the mixture slurry on the current collector.

(Positive Electrode Active Material)

The positive electrode active material is not particularly limited as long as it is a material capable of absorbing and releasing lithium, and the positive electrode active material can be usually used in a lithium ion secondary battery. Specific examples of the positive electrode active material include oxides containing lithium (Li) and nickel (Ni) as constituent metal elements, and in addition, oxides containing at least one metal element other than lithium and nickel (that is, transition metal element other than Li and Ni and/or typical metal element) as a constituent metal element at a ratio that is the same extent as or less than that of nickel in terms of the atom number. The at least one metal element other than Li and Ni can be, for example, one metal element, or two or more metal elements selected from the group consisting of Co, Mn, Al, Cr, Fe, V, Mg, Ca, Na, Ti, Zr, Nb, Mo, W, Cu, Zn, Ga, In, Sn, La, and Ce. The positive electrode active materials may be used singly, or in mixture of two or more kinds thereof.

In a preferred embodiment, examples of the positive electrode active material include lithium nickel cobalt aluminum-based oxides (NCA) represented by Formula (1): $Li_tN_{1-x-y}CO_xAl_yO_2$ (wherein $0.95 \leq t \leq 1.15$, $0 \leq x \leq 0.3$, $0.1 \leq y \leq 0.2$, and $x+y<0.5$). Specific examples of the NCA include $LiNi_{0.8}Co_{0.15}Al_{0.05}O_2$.

In another preferred embodiment, examples of the positive electrode active material include lithium nickel cobalt manganese-based oxides (NCM) represented by Formula (2): $LiNi_aCo_bMn_cO_2$ (wherein $0<a<1$, $0<b<1$, $0<c<1$, and $a+b+c=1$). The NCM has a high energy density per volume and excellent thermal stability.

The electrode mixture layer usually contains the positive electrode active material at a content of 10% by mass or more, preferably 30% by mass or more, more preferably 50% by mass or more, and particularly preferably 70% by mass or more. Furthermore, the content is usually 99.9% by mass or less, and preferably 99% by mass or less.

The positive electrode active material layer 31 is configured to bind from 88 to 99 parts by weight of a powder positive electrode material containing the positive electrode active material, the conductive auxiliary such as a carbon black added if necessary, and another auxiliary with from 1 to 12 parts by weight of a vinylidene fluoride-based polymer, a tetraethylene polymer, and a latex-like styrene-butadiene copolymer. In order to obtain the positive electrode active material layer 31 shown in FIG. 2, it is required that the powder positive electrode material and the binder are mixed with water or an organic solvent to obtain a positive electrode mixture slurry, and the positive electrode mixture slurry is applied to the undercoat layer and dried to form the positive electrode mixture layer 11B.

(Negative Electrode Active Material)

As the negative electrode active material, at least one can be used selected from the group consisting of metallic lithium, lithium-containing alloys, metals and alloys capable of being alloyed with lithium, oxides capable of being doped and undoped with a lithium ion, transition metal nitrides capable of being doped and undoped with a lithium ion, and carbon materials capable of being doped and undoped with a lithium ion (one may be used singly, or a mixture containing two or more kinds thereof may be used).

Examples of the metal or the alloy capable of being alloyed with lithium (or a lithium ion) include silicon, silicon alloys, tin, and tin alloys. In addition, lithium titanate may be used.

Among the negative electrode active materials, the carbon materials capable of being doped and undoped with a lithium ion are preferable. Examples of the carbon material include carbon blacks, activated carbon, graphite materials (artificial graphite and natural graphite), and amorphous carbon materials. The carbon material may have any form of a fibrous, a spherical, a potato-like, or a flake-like form.

Specific examples of the amorphous carbon material include hard carbon, coke, mesocarbon microbeads (MCMBs) fired at 1,500° C. or less, and mesophase pitch carbon fibers (MCFs).

Examples of the graphite material include natural graphite and artificial graphite. As the artificial graphite, a graphitized MCMB, a graphitized MCF, or the like is used. In addition, as the graphite material, a material containing boron, or the like can be used. As the graphite material, a material coated with a metal such as gold, platinum, silver, copper, or tin, a material coated with amorphous carbon, or a mixture of amorphous carbon and graphite can also be used. The carbon materials may be used singly, or in mixture of two or more kinds thereof.

(Method of Forming Electrode Mixture Layer)

The electrode for a lithium ion secondary battery according to the present embodiment can be manufactured by applying an electrode mixture slurry containing the electrode active material, the conductive auxiliary, and the binder to the surface of the current collector, and drying the electrode mixture slurry. As the binder that binds the electrode active material, a fluorine-based resin represented by PVDF, a polysaccharide polymer, SBR, or the like can be used, and the binder is not limited thereto. The same binder as that contained in the undercoat layer can also be used. In this case, it is preferable to form an electrode mixture slurry by dispersing the electrode active material and the conductive auxiliary in a solution in which the binder is dissolved in a solvent. The electrode mixture slurry can contain the binder at a content of, for example, about from 1 to 10% by mass with respect to the total solid component. In a case in which the content of the binder is less than 1% by mass, the effect of cutting off the conductive path is small in the case of a temperature rise in the mixture layer. In a case in which the content of the binder is more than 10% by mass, the contact resistance in the mixture layer increases and the battery capacity decreases because the binder generally exhibits an insulating property, and such a state is not preferable.

The solvent contained in the mixture slurry is also used as a common solvent in the case of preparing the binder. As the solvent, a non-proton polar solvent represented by N-methylpyrrolidone, dimethyl sulfoxide, propylene carbonate, dimethylformamide, γ-butyrolactone, or the like, or a mixture thereof can be selected.

In the applying and the drying of the mixture slurry on the current collector, the method of applying and the method of drying are not particularly limited. Examples of the method of applying include slot die coating, slide coating, curtain coating, and gravure coating. Examples of the method of drying include warm air drying, hot air drying, low-humidity air drying, vacuum drying, and drying by (far) infrared radiation. The drying time and the drying temperature are not particularly limited, and the drying time is usually from 1 minute to 30 minutes, and the drying temperature is usually from 40° C. to 80° C.

The method of manufacturing the mixture layer preferably include a step of reducing the porosity of the active material layer by a pressure treatment using a mold press, a roll press, or the like after the applying and the drying of the mixture slurry on the current collector.

[Electrolytic Solution]

The electrolytic solution is preferably, for example, one usually used in a lithium ion secondary battery, and is specifically one having a form in which a supporting salt (lithium salt) is dissolved in an organic solvent. Examples of the lithium salt include at least one selected from an inorganic acid anion salt such as lithium hexafluorophosphate ($LiPF_6$), lithium tetrafluoroborate ($LiBF_4$), lithium perchlorate ($LiClO_4$), lithium hexafluoroarsenate ($LiAsF_6$), lithium hexafluorotantalate ($LiTaF_6$), lithium tetrachloroaluminate ($LiAlCl_4$), or lithium decachlorodecaborate ($Li_2B_{10}Cl_{10}$), or an organic acid anion salt such as lithium trifluoromethanesulfonate ($LiCF_3SO_3$), lithium bis(trifluoromethanesulfonyl)imide ($Li(CF_3SO_2)_2N$), or lithium bis(pentafluoroethanesulfonyl)imide ($Li(C_2F_5SO_2)_2N$). Among the lithium salts, lithium hexafluorophosphate ($LiPF_6$) is preferable.

As the organic solvent, for example, at least one can be used selected from the group consisting of cyclic carbonates, fluorine-containing cyclic carbonates, chain carbonates, fluorine-containing chain carbonates, aliphatic carboxylic acid esters, fluorine-containing aliphatic carboxylic acid esters, γ-lactones, fluorine-containing γ-lactones, cyclic ethers, fluorine-containing cyclic ethers, chain ethers, and fluorine-containing chain ethers.

Examples of the cyclic carbonate include propylene carbonate (PC), ethylene carbonate (EC), and butylene carbonate (BC). Examples of the fluorine-containing cyclic carbonate include fluoroethylene carbonate (FEC). Examples of the chain carbonate include dimethyl carbonate (DMC), diethyl carbonate (DEC), ethyl methyl carbonate (EMC), methyl propyl carbonate (MPC), ethyl propyl carbonate (EPC), and dipropyl carbonate (DPC). Examples of the aliphatic carboxylic acid ester include methyl formate, methyl acetate, and ethyl propionate. Examples of the γ-lactone include γ-butyrolactone. Examples of the cyclic ether include tetrahydrofuran, 2-methyltetrahydrofuran, and 1,4-dioxane. Examples of the chain ether include 1,2-ethoxyethane (DEE), ethoxymethoxyethane (EME), diethyl ether, 1,2-dimethoxyethane, and 1,2-dibutoxyethane. Other examples include nitriles such as acetonitrile and amides such as dimethylformamide. These can be used singly, or in combination of two or more kinds thereof.

[Separator]

Examples of the separator include microporous films including a resin such as polyethylene (PE), polypropylene (PP), a polyester, cellulose, or a polyamide; porous flat plates; and nonwoven fabrics. Preferable examples include porous resin sheets having a single-layer or multi-layer structure that mainly include one, or two or more polyolefin resins. The separator can have a thickness of, for example, from 15 μm to 30 μm. In a preferred aspect, the separator includes a porous resin layer including a thermoplastic resin such as polyethylene, and has a shutdown function. According to the aspect, in a case in which the temperature of the separator reaches the softening point of the thermoplastic resin, the resin is melted and the pores are clogged, so that the current can be cut off.

(Effects)

In the undercoat layer 32 in the present embodiment, it is considered that in a case in which the battery temperature rapidly rises owing to crushing, overcharge, or the like, the internal resistance of the battery (the resistance of the undercoat layer) is increased by the binder, the thermally expandable microcapsule having a maximum volume expansion temperature of from 70° C. to 180° C., and in some cases, the polymer particle having a softening point of from 70° C. to 150° C., so that the short-circuit current is significantly reduced and the heat generation of the battery is suppressed.

EXAMPLES

Preparation of Undercoat Layer

1. Preparation of Slurry for Undercoat

A slurry was prepared using a 5L planetary disperser.

For 10 minutes, 125.4 g of $Al_2O_3$ (manufactured by Wako Pure Chemical Industries, Ltd., average particle size: 2 μm) as a filler, 33.0 g of SUPER P (conductive carbon manufactured by TIMCAL Ltd.), 66.0 g of MATSUMOTO MICROSPHERE (registered trademark) (a microcapsule manufactured by Matsumoto Yushi-Seiyaku Co., Ltd.) as an additive [Y], and 82.5 g of KS-6 (flaky graphite manufactured by TIMREX) were mixed, then 150.0 g of a CMC aqueous solution adjusted to 1.2% was added, and the mixture was further mixed for 20 minutes.

Then, a CMC aqueous solution was added three times in an amount of 133.3 g in each time, and the mixture was mixed for 20 minutes in each of the steps.

Next, 16.5 g of a 50% aqueous solution of SBR (TRD2101 manufactured by JSR Corporation) and 165.0 g of a 40% aqueous solution of an additive [X] (CHEMIPEARL (registered trademark) manufactured by Mitsui Chemicals, Inc.) were added, and the mixture was kneaded for 20 minutes. Then, the mixture was vacuum-degassed for 30 minutes. Thus, a slurry having a solid content concentration of 33% was prepared.

2. Application and Drying

The slurry was applied using a die coater. The slurry was applied to one surface of an aluminum foil (thickness: 20 μm, width: 200 mm) and dried so that the applied slurry has a thickness after the drying of 5 μm (a weight of about 0.5 mg/cm$^2$) in Composition Example 3, and 10 μm (a weight of about 1.0 mg/cm$^2$) in Composition Examples 1 and 2. Next, the slurry was applied to the other surface (surface without application) of the aluminum foil and dried so that the applied slurry has a thickness of 5 μm in Composition Example 3 in the same manner.

Thus, an aluminum foil roll having undercoat layers (UC-1) applied to both the surfaces was obtained. A list of Composition Examples 1 to 3 of the undercoat layer is shown below (Table 1). The composition example of $Al_2O_3$/SP/SBR/CMC/[X]/[Y] is represented by a mass ratio (%).

TABLE 1

| | $Al_2O_3$ (%) | SP (%) | SBR (%) | CMC (%) | KS-6 (%) | X (%) | Y (%) | Applied slurry thickness (μm) |
|---|---|---|---|---|---|---|---|---|
| Composition Example 1 | 78 | 10 | 5 | 2 | 5 | 0 | 0 | 10 |
| Composition Example 2 | 38 | 10 | 5 | 2 | 5 | 20 | 20 | 10 |
| Composition Example 3 | 38 | 10 | 5 | 2 | 5 | 20 | 20 | 5 |

Preparation of Positive Electrode
1. Preparation of Slurry

A slurry was prepared using a 5L planetary disperser.

For 10 minutes, 1,520 g of NCM523 (manufactured by Umicore, composition formula: $LiNi_{0.5}Co_{0.2}Mn_{0.3}O_2$), 30 g of SUPER P (conductive carbon manufactured by TIMCAL Ltd.), and 30 g of KS-6 (flaky graphite manufactured by TIMREX) were mixed, then 50 g of N-methylpyrrolidone (NMP) was added, and the mixture was further mixed for 20 minutes.

Next, 350 g of an 8% -PVDF solution (PVDFW # 7200 manufactured by KUREHA CORPORATION dissolved in NMP) was added, the mixture was kneaded for 30 minutes, then 260 g of an 8% -PVDF solution was further added, the mixture was kneaded for 15 minutes, 220 g of an 8% -PVDF solution was further added, and the mixture was kneaded for 15 minutes. Then, 80 g of NMP was added, and the mixture was mixed for 30 minutes for viscosity adjustment and then vacuum-degassed for 30 minutes. Thus, a slurry having a solid content concentration of 65% was prepared.

2. Application and Drying

The slurry was applied using a die coater. The slurry was applied to one surface of the aluminum foil to which the undercoat layer (UC-1) was applied (aluminum foil thickness: 20 μm+UC layer thickness: 5 μm (on one surface), width: 200 mm), and dried so that the applied slurry has a weight of 19.0 mg/cm² after the drying. Next, the slurry was applied to the other surface (surface without application) of the aluminum foil to which the undercoat layer (UC-1) was applied, and dried so that the applied slurry has a weight of 19.0 mg/cm² in the same manner (C-1).

The obtained positive electrode roll having both the surfaces under the application (38.0 mg/cm²) was dried in a vacuum drying oven at 130° C. for 12 hours.

3. Press

A 35 ton press was used. The gap (interval) between the upper and the lower rolls was adjusted, and the positive electrode was pressed so that the press density was 2.9±0.05 g/cm³.

4. Slitting

The electrode was slit so that the application area of the electrode (front surface: 56 mm×334 mm, back surface: 56 mm×408 mm) and a margin for welding a tab were obtained to obtain a positive electrode C-1 having the undercoat layer (UC-1) disposed on the aluminum foil.

Preparation of Negative Electrode
1. Preparation of Slurry

A slurry was prepared using a 5L planetary disperser.

For 10 minutes, 1,050 g of natural graphite and 11 g of SUPER P (conductive carbon, BET specific surface area: 62 m²/g) were mixed, then 450 g of a 1.2% CMC aqueous solution was added, and the mixture was further mixed for 20 minutes. Next, 150 g of a 1.2% CMC aqueous solution was added, and the mixture was further mixed for 30 minutes. Then, 293.5 g of a CMC aqueous solution was further added, the mixture was mixed for 30 minutes, then 450 g of water as a solvent was added, the mixture was mixed for 15 minutes, then 45 g of a 50% SBR aqueous solution (manufactured by JSR Corporation) was further added, and the mixture was kneaded for 15 minutes and then vacuum-degassed for 10 minutes. Thus, a slurry having a solid content concentration of 45% was prepared.

2. Application and Drying

The slurry was applied using a die coater. The slurry was applied to one surface of a copper foil (thickness: 10 μm) and dried so that the applied slurry has a weight of 11.0 mg/cm² after the drying. Next, the slurry was applied to the other surface (surface without application) of the copper foil and dried so that the applied slurry has a weight of 11.0 mg/cm² in the same manner. The obtained negative electrode roll having both the surfaces under the application (22.0 mg/cm²) was dried in a vacuum drying oven at 120° C. for 12 hours (A-1).

3. Press

A small press was used. The gap (interval) between the upper and the lower rolls was adjusted, and the negative electrode was pressed so that the press density was 1.45±0.05 g/cm³.

4. Slitting

The electrode was slit so that the application area of the electrode (front surface: 58 mm×372 mm, back surface: 58 mm×431 mm) and a margin for welding a tab were obtained to obtain a negative electrode A-1.

Preparation of Battery
[Wound Battery (Design Capacity: 1 Ah)]
1. Winding

As a separator, a polyethylene porous film (60.5 mm×450 mm) having a porosity of 45% and a thickness of 25 μm was used (S-1).

The negative electrode A-1 (front surface/back surface), the separator (S-1), the positive electrode C-1 (back surface/front surface) having the undercoat layer (UC-1) disposed on the aluminum foil, and the separator (S-1) were stacked, wound, and then press-molded. Next, an aluminum tab was joined using an ultrasonic joining machine to the margin portion of the positive electrode C-1 on which the undercoat layer (UC-1) was disposed, and a nickel tab was joined to the margin portion of the negative electrode A-1 using an ultrasonic joining machine. The laminate was sandwiched between laminate sheets, and the resulting product was heat-sealed on the three sides.

2. Putting Electrolytic Solution

The resulting product was dried under reduced pressure at 70° C.×12 h using a vacuum dryer before putting an electrolytic solution. Into the resulting product, 4.7±0.1 g of an electrolytic solution was put, and then the resulting product was heat-sealed under vacuum.

3. Activation Processing

A battery after putting the electrolytic solution was held for 24 hours. Next, the battery was charged at a constant current of 0.05 C for 4 hours (0.05 C-CC), and then the charging was paused for 12 hours. Then, the battery was charged at a constant current of 0.1 C and a constant voltage up to 4.2V (0.1 C-CCCV), the charging was paused for 30 minutes, and then the battery was discharged at a constant current of 0.1 C up to 2.8 V (0.1 C-CC). Furthermore, a charge and discharge cycle (charging at 0.1 C-CCCV to 4.2 V and discharging at 0.1 C-CC to 2.8 V) were repeated five times, and then the battery was stored in a full charge state at 4.2 V (SOC 100%) at 25° C. for 5 days.

Thus, the wound battery of Examples 1 and 2 and Comparative Examples 1 to 3 was obtained.

[Forced Internal Short-Circuit Test (Nail Penetration Test)]

A nail penetration test (diameter of nail: 6 mm, nail penetration speed: 20 mm/sec) was performed using the prepared wound battery (design capacity: 1 Ah). A nail having a diameter of 6 mm was inserted into the middle of the battery (cell) at a speed of 20 mm/sec to short-circuit the positive electrode and the negative electrode inside the battery container. At this time, the temperature rise coefficient (the amount of temperature rise per unit time) inside the battery was measured. In a case in which the temperature rise coefficient was reduced to 50% or less with respect to the temperature rise coefficient in Comparative Example 1 (both [X] and [Y] were not added), the "heat generation suppressing effect" was determined to be "present", and in the other cases, the "heat generation suppressing effect" was determined to be "absent".

The following list (Table 2) shows Composition Examples employed in Examples and Comparative Examples, properties of [X] and [Y] employed in each Composition Example, and presence/absence of the heat generation suppressing effect by the nail penetration test.

TABLE 2

|  | Composition Example | X | | Y | | | Heat |  |
|---|---|---|---|---|---|---|---|---|
|  |  | Particle size | Softening point | Maximum expansion temperature | Average particle size | Expansion start temperature | Temperature rise coefficient °C./sec | generation suppressing effect |
| Comparative Example 1 | 1 | — | — | — | — | — | 654 | Absent |
| Example 1 | 2 | 0.6 | 132 | 145 to 155 | 6 to 11 | 120 to 130 | 175 | Present |
| Comparative Example 2 | 2 | 0.6 | 132 | 125 to 135 | 6 to 10 | 100 to 110 | 554 | Absent |
| Example 2 | 3 | 0.6 | 110 | 145 to 155 | 6 to 11 | 120 to 130 | 241 | Present |
| Comparative Example 3 | 3 | 9.5 | 110 | 145 to 155 | 6 to 11 | 120 to 130 | 573 | Absent |

In comparison of Example 1 with Comparative Example 1, the temperature rise coefficient is reduced from 654° C./sec to 175° C./sec by 70% or more owing to addition of the additives [X] and [Y]. Therefore, owing to the addition of the additives [X] and [Y], the resistance of the undercoat layer formed between the positive electrode current collector and the positive electrode active material layer is increased and an excessive current is prevented from flowing in the battery in the case of abnormal heat generation due to an internal short-circuit or the like, so that the safety of the lithium ion secondary battery can be improved.

In comparison of Comparative Example 2 with Example 1, it is found that even in a case in which the same Composition Example 2 is employed as in Comparative Example 2, the temperature rise coefficient is reduced from 654° C./sec in Comparative Example 1 to 554° C./sec by only about 15%, and heat generation suppressing effect cannot be obtained in a case in which the temperature of the softening point of the additive [X] is close to the maximum expansion temperature range of the additive [Y], and the maximum expansion temperature is lower than the softening point temperature in some cases. Therefore, it is found that the maximum expansion temperature of the additive [Y] is desirably higher than the softening point temperature of the additive [X].

In comparison of Comparative Example 3 with Example 2, it is found that even in a case in which the same Composition Example 3 is employed and the maximum expansion temperature is higher than the softening point temperature, the temperature rise coefficient is reduced from 654° C./sec to 573° C./sec by only about 10%, and heat generation suppressing effect cannot be obtained in a case in which the additive [X] has a particle size of 9.5 μm as in Comparative Example 3, and the particle size is 10 times or more larger than that of the additive [X] in Example 2. Therefore, the additive [X] desirably has an average particle size of 5 μm or less.

The disclosure of Japanese Patent Application No. 2018-068824 filed on Mar. 30, 2018 is incorporated herein by reference in its entirety.

All documents, patent applications, and technical standards described herein are incorporated herein by reference to the same extent as in a case in which each document, patent application, and technical standard are specifically and individually stated to be incorporated herein by reference.

The invention claimed is:

1. A positive electrode for a lithium ion secondary battery, the positive electrode comprising:
   a positive electrode current collector; and
   a positive electrode mixture layer that is provided on at least one side of the positive electrode current collector, the positive electrode mixture layer including:
   a positive electrode active material layer, and
   an undercoat layer formed between the positive electrode current collector and the positive electrode active material layer, the undercoat layer containing:
   a conductive auxiliary,
   a binder,
   a thermally expandable microcapsule having a maximum volume expansion temperature of from 70° C. to 180° C., and
   a polymer particle having a softening point of from 70° C. to 150° C.,
   wherein the softening point of the polymer particle is lower than the maximum volume expansion temperature of the thermally expandable microcapsule,
   the polymer particle has an average particle size of from 0.1 to 5 μm, and
   a content of the polymer particle in the undercoat layer is from 10 to 40% by mass with respect to a total amount of the undercoat layer.

2. The positive electrode according to claim 1, wherein the conductive auxiliary comprises a carbon particle having an average particle size of 5 μm or less and a primary particle size of 0.5 μm or less, and the binder has an average particle size of from 0.1 to 0.3 μm.

3. The positive electrode according to claim 1, wherein the undercoat layer contains the conductive auxiliary at a content of from 5 to 20% by mass, and contains the binder at a content of from 3 to 20% by mass.

4. The positive electrode according to claim 1, wherein the thermally expandable microcapsule has an average particle size of 50 μm or less, and the undercoat layer contains the thermally expandable microcapsule at a content of from 5 to 20% by mass.

5. The positive electrode according to claim 1, wherein the thermally expandable microcapsule includes:
   an outer shell including a thermoplastic resin; and
   a volatile expanding agent that includes a hydrocarbon having a boiling point of 100° C. or less and that is enclosed in the outer shell.

6. The positive electrode according to claim 1, wherein the binder is polyacrylic acid, styrene-butadiene rubber, polyvinyl alcohol, polyvinyl acetate, polyethylene oxide, polyvinyl pyrrolidone, polyacrylamide, or water-dispersible polyvinylidene fluoride.

7. A lithium ion secondary battery, comprising:
the positive electrode according to claim 1;
a negative electrode;
a separator; and
a nonaqueous electrolyte.

8. The lithium ion secondary battery according to claim 7, wherein the separator includes a thermoplastic resin, and the thermoplastic resin has a softening point that is higher than a melting point of the polymer particle and lower than a volume expansion start temperature of the thermally expandable microcapsule.

* * * * *